Feb. 23, 1937.  W. S. GORDON, JR  2,071,876
FLUID FUEL BURNER CONTROL
Filed Aug. 4, 1934
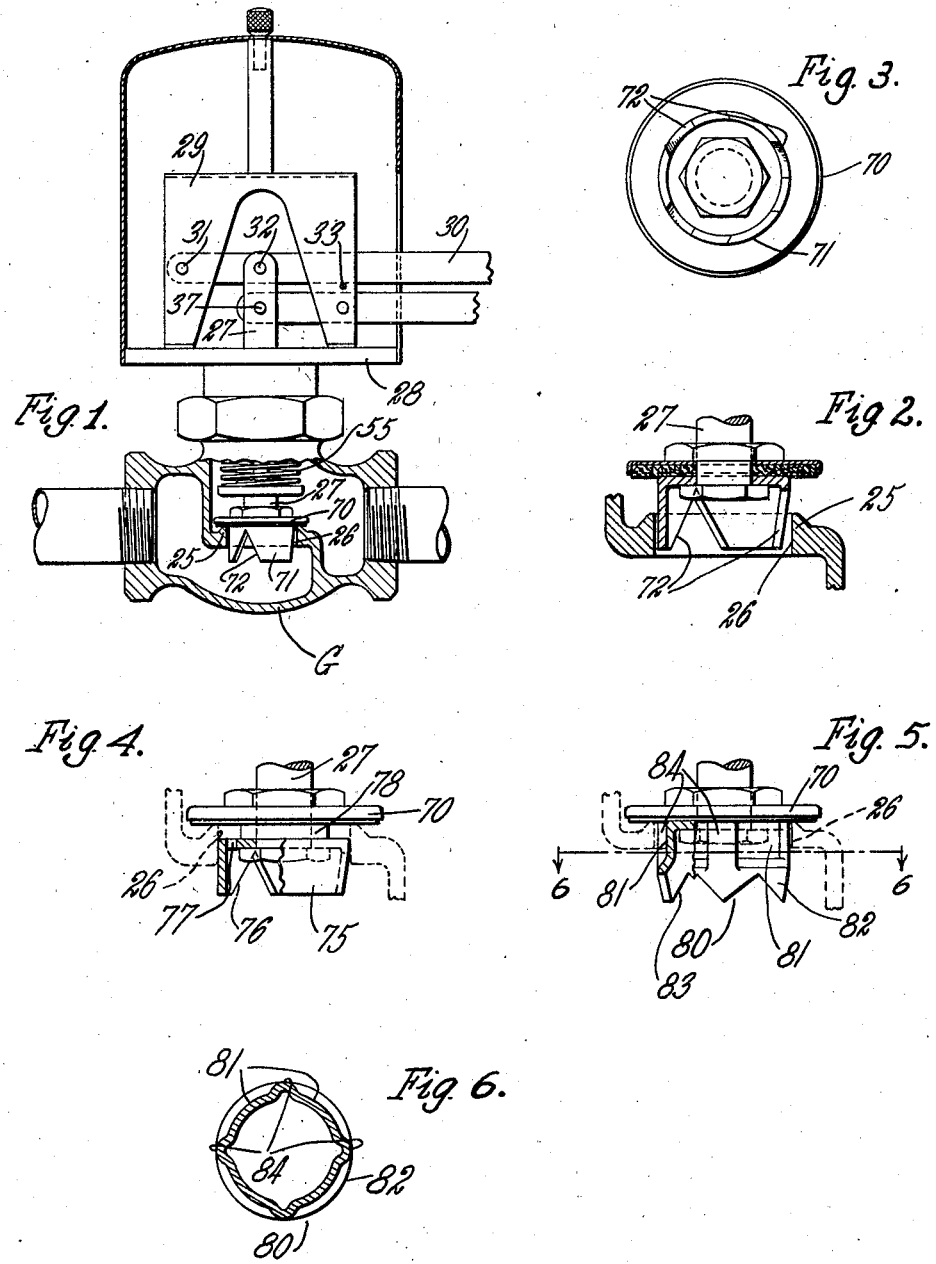
INVENTOR
William S. Gordon Jr.
By Parker, Brockwow & Farmer.
ATTORNEYS Patented Feb. 23, 1937

2,071,876

UNITED STATES PATENT OFFICE 2,071,876

FLUID FUEL BURNER CONTROL

William S. Gordon, Jr., North Tonawanda, N. Y., assignor to Roberts-Gordon Appliance Corporation, Buffalo, N. Y.

Application August 4, 1934, Serial No. 738,553

2 Claims. (Cl. 251—34)

This invention relates to valves for controlling the supply of fuel to fluid fuel burners.

The objects of this invention are to provide valves of this kind by which an accurate control of fuel supplied to the burner can be obtained; also to provide valve and control means for burners which are so constructed that a relatively large flow of fuel takes place for a short interval of time during the opening of the fuel supply valve, to facilitate the proper igniting of the fuel at the burner; and also to improve the construction of valves for use in connection with control means for fluid fuel burners in other respects hereinafter specified, In the accompanying drawing:

Fig. 1 is a central, sectional elevation of one form of fuel supply valve embodying this invention and a portion of the actuating mechanism therefor.

Fig. 2 is a fragmentary, central, sectional elevation of the valve seat and the movable member of the valve shown in Fig. 1.

Fig. 3 is a bottom plan view of the movable member of the valve shown in Fig. 2.

Fig. 4 is an elevation, partly in section, of the movable member of a valve of slightly modified construction.

Fig. 5 is an elevation, partly in section of still another modified form of the movable valve member.

Fig. 6 is a sectional plan view on line 6—6, Fig. 5.

My improved valve and control means shown in the accompanying drawing are used in connection with a gas burner (not shown) of the conversion type adapted to be installed in a heater constructed for the consumption of solid fuel.

The valve G, as more clearly shown in Fig. 1, includes a seat 25 through which a passage for the fluid fuel is formed. A movable valve member cooperates with the valve seat and is adjustable in a cylindrical bore or recess 26 in the seat, the valve member in the particular construction shown having a stem 27 which extends outwardly through the valve, and the valve member may be moved vertically, as shown in Fig. 2, to vary the amount of fuel flowing through the valve. In the construction illustrated, the valve stem 27 passes through a base member or plate 28 rigidly secured to the valve housing and having a standard or bracket 29 mounted thereon. This type of valve is desirable for use in connection with a hand-operated control mechanism, and in order to set the valve for different openings according to the amount of heat desired from the burner, it is desirable that accurate positioning of the movable valve member with relation to its seat be effected. This may be done in any suitable or desired manner so that a relatively large movement of the hand-operated control results in a small movement of the movable valve member. For this purpose, a lever 30 is shown in the construction illustrated, which is pivoted at one end at 31 on the bracket 29, and the other end of which may be connected with the hand-operated adjusting means (not shown) for the valve. The valve stem 27 is preferably slotted at its upper end, and the lever 30 extends into the slot and is pivoted to the valve stem 27 at 32. 33 represents a stop pin which limits the downward movement of the free end of the lever 30.

Fuel supply valves as heretofore constructed usually have a movable member having a plate or disk 70 arranged to seat on the upper face of the valve seat to close the valve. With a valve of this type, a regulation of the flow of fuel is difficult, for the reason that even a very slight movement of the plate or disk 70 from the seat of the valve produces a relatively large flow of fuel through the valve, so that accurate adjustment of the disk 70 for small valve openings is extremely difficult. Valves of this kind have also been provided with downwardly extending skirt portions 71 guided in the usual cylindrical bore or opening of the valve, and such skirts have been provided with deformations of various types, such for example as slits or cuts 72 in the skirt portion, which, for example, may be of inverted V-shape. Even with such skirts, an accurate control of the minimum fuel flow is difficult, since even with these deformations a variation of a very small fraction of an inch produces a relatively great variation in the flow of fuel through the valve.

In accordance with my invention, I provide valves with skirt portions of the type heretofore used, and also with deformations therein such as the inverted V-shaped cuts, but I arrange these cuts in such a manner that the apices of the cuts are spaced a distance below the upper ends of the skirts, so that considerable upward movement of the valve is possible before fuel can pass through the deformations or cuts in the skirt. I also provide means for permitting the minimum flow of fuel through the valve before the deformations in the skirt begin to pass out of registration with the cylindrical aperture of the valve seat. In the construction shown in Figs. 1 to 3, I provide a valve in which the skirt portion 72 is made of smaller diameter than the cylindrical bore or aperture 26 in the valve seat, and the difference in diameters of the skirt portion and the bore 26 is such as to permit the minimum flow of fuel to pass through the valve. The difference in diameters may be made quite small, and I have found that with certain types of valves a difference in diameter of .006 of an inch is sufficient to provide for the minimum flow of fuel before the cuts or deformations 72 of the skirt are moved above the upper edge of the bore 26 of the valve seat. The difference in diameters of the valve seat and the bore may, however, be varied to suit the particular installation in connection with which the fuel supply valve is used.

In Fig. 4, I have shown a valve with a skirt portion 75 of modified construction. This skirt portion is preferably of such diameter as to form a snug sliding fit within the bore 26 of the valve seat and the skirt portion is also provided with cuts or deformations 76 similar to those shown in connection with Figs. 1 to 3. In the construction illustrated, however, the skirt portion 75 is spaced a slight distance below the valve disk 70 and the upper wall of the skirt portion is provided with one or more small apertures 77 of the correct size to permit the minimum quantity of fuel to pass through the valve. It will, consequently, be obvious that if the movable member of the valve shown in Fig. 4 is raised so that the plate or disk 70 clears the valve seat, fuel will immediately pass through the aperture or apertures so as to provide for the minimum flow of fuel. In this construction, a sleeve or collar 78 may be arranged between the skirt portion 75 and the disk or plate 70 of the movable member of the valve. After the minimum fuel supply has passed, the valve may be moved to various positions to expose more or less of the deformations or cuts 76 in the skirt portion.

In Figs. 5 and 6 is illustrated a valve having a skirt portion which is so formed as to provide for an initial relatively large flow of fuel during the initial opening movement of the valve member. In this construction, the skirt portion 80 of the valve is provided at the portion thereof adjacent to the plate or disk 70 with constricted portions 81 of materially less diameter than the diameter of the bore 26 of the valve seat, and below these constricted portions 81, the skirt portion is of greater diameter so as to either fit snugly within the valve seat, or it may be of slightly less diameter than that of the bore 26 as described in connection with Figs. 1 to 3. The vertical length of the constricted portion of the skirt is preferably somewhat greater than the vertical length of the bore 26 of the valve seat, so that when the plate or disk 70 is raised from contact with the seat, a relatively large volume of fuel will flow between the constricted portions 81 of the skirt and the valve seat, and thus produce an initial large flow of gas to insure proper lighting of the main burner. Upon further upward movement of the valve, the portion 82 of greater diameter will enter into the bore 26 of the valve to produce the minimum flow by the passage of gas only through the space between said portion 82 and the wall of bore 26, or, if desired, the minimum flow can be obtained by means of an aperture through a constricted portion or, as indicated in Fig. 4, the skirt of this valve may also be provided with deformations or cuts 83 to provide for further graduation of the flow of fuel through the valve.

The constricted portion 81 of the skirt portion of the valve is preferably provided at intervals with ribs or ridges 84 extending outwardly beyond the constricted portion to form a relatively snug fit within the bore 26 to insure a proper guidance of the skirt 80 within the bore of the valve.

When a valve with a skirt portion, such as shown in Figs. 5 and 6, is employed in connection with a burner control, another advantageous result develops, namely, that the gas initially supplied to the burner is materially greater than the corresponding supply of air admitted to the burner, since while the skirt portion is in a position to by-pass a relatively large amount of gas the air damper of the control means E will still be either closed or only very slightly open. This is of advantage in that better ignition of the burner has been found to result when the initial air supply is less than that required for efficient combustion, since under such circumstances, there is less tendency of the flame to back-fire into the mixing tubes of the burner.

I claim as my invention:

1. Means for controlling the flow of fuel to a fluid fuel burner, including a fuel supply valve which is adapted to pass fuel to the burner and comprising a seat surrounding the valve opening, a movable valve member having a substantially flat disk arranged to cooperate with said seat to effect a closing of said valve, and a skirt extending below said disk through said seat into said valve opening, said skirt being provided with a by-pass for fuel effective when said movable valve member has been moved so that said disk is in a slightly open position to permit a large flow of gas through the valve and which by-pass becomes reduced to an extent such that only a minimum of gas flows through said valve upon farther movement of said movable valve member into open position, and said valve having deformations in said skirt which when said valve is still farther moved towards open position, enables a large volume of gas to pass through said valve.

2. Means for controlling the flow of fuel to a fluid fuel burner, including a fuel supply valve which is adapted to pass fuel to the burner and comprising a seat surrounding the valve opening, a valve member having a substantially flat disk arranged to cooperate with said seat to effect a closing of said valve, and a skirt extending below said disk through said seat into said valve opening, said skirt having the portion thereof adjacent to said disk provided with parts spaced from said seat to provide a free flow of gas immediately upon the movement of said disk away from said seat, and a portion arranged at a greater distance from said disk and which is adapted to approach more closely to the sides of said valve opening to restrict the flow of gas, and which is provided with deformations at a greater distance from said disk than said latter portion through which fuel may flow in accordance with the distance of said disk from said seat, whereby an initial large flow of fuel is provided on first opening said valve and a restricted flow of fuel after the initial opening movement of said valve.

WILLIAM S. GORDON, Jr.